(12) United States Patent
Klinkner

(10) Patent No.: US 7,539,836 B1
(45) Date of Patent: May 26, 2009

(54) METHOD AND SYSTEM FOR CONFIGURING A DATA STORAGE OBJECT

(75) Inventor: Steven Klinkner, Fremont, CA (US)

(73) Assignee: NETAPP, Inc., Sunnyvale, CA (US)

( * ) Notice: Subject to any disclaimer, the term of this patent is extended or adjusted under 35 U.S.C. 154(b) by 346 days.

(21) Appl. No.: 11/109,193

(22) Filed: Apr. 18, 2005

(51) Int. Cl.
*G06F 12/00* (2006.01)
(52) U.S. Cl. .................... 711/170; 715/764
(58) Field of Classification Search ............ 711/170; 715/764
See application file for complete search history.

(56) References Cited

U.S. PATENT DOCUMENTS

| | | | | |
|---|---|---|---|---|
| 6,584,499 | B1* | 6/2003 | Jantz et al. | 709/220 |
| 6,976,145 | B1* | 12/2005 | Bradford | 711/170 |
| 7,383,381 | B1* | 6/2008 | Faulkner et al. | 711/114 |
| 2005/0240776 | A1* | 10/2005 | Schmidt et al. | 713/185 |

OTHER PUBLICATIONS

NetApp FlexVol and FlexClone Raise the Rate of Return on Storage Resources, The Clipper Group Navigator, published 1993, Nov. 15, 2004, 3 pages.

* cited by examiner

*Primary Examiner*—Matt Kim
*Assistant Examiner*—John P Fishburn

(57) ABSTRACT

A method and system for generating and configuring a data storage object, such as a volume, are described. According to one aspect of the invention, utilizing a graphical user interface, an administrator selects or otherwise identifies an existing data storage object on a data storage system. Next, one or more configuration parameter values associated with one or more configuration parameters of the existing data storage object are extracted from the existing data storage object on the storage system. Finally, a new data storage object is automatically generated and configured according the configuration parameter values extracted from the existing data storage object.

31 Claims, 9 Drawing Sheets

METHOD AND SYSTEM FOR CONFIGURING A DATA STORAGE OBJECT

FIELD OF THE INVENTION

At least one embodiment of the present invention relates generally to data storage systems, and in particular, to a method and system for automatically configuring a data storage object associated with a data storage system.

BACKGROUND

Modern data storage systems, including network-attached storage (NAS) systems and storage area networks (SANs), have become increasingly complicated to set up, configure and maintain. Even in a seemingly simple scenario involving a single NAS system, it may be necessary to configure a wide variety of data storage objects (e.g., disks, volumes, etc.), each with multiple configuration parameters. For example, an NAS system may include one or more of the following data storage objects: disks, disk groups for RAID (i.e., redundant array of independent disks), aggregates, and/or volumes. Furthermore, each data storage object may have multiple configuration parameters. For example, the configuration parameters for a volume may include a formal name by which the volume is identified, a descriptive name, a storage size, a physical disk association, and others.

A variety of tools have been developed to simplify the tasks associated with configuring and administering data storage objects in data storage systems. For example, a typical data storage system includes one or more management applications designed to provide system administrators with the ability to configure and maintain data storage objects associated with data storage systems. For example, a typical management application may provide a system administrator with a command line interface or a graphical user interface (GUI) for initially generating and configuring one or more data storage objects. To configure a data storage object using a command line interface, a system administrator may have to input (e.g., type on a keyboard) a command and several parameters associated with the command. With a GUI, a system administrator may interact with a management application by specifying, or selecting (e.g., with a pointing device, such as a computer mouse) a variety of configuration parameters for a data storage object. Some management applications may provide system administrators with a centralized view of an enterprise-wide storage infrastructure. In addition, in some cases, the management applications may include tools for browsing existing data storage objects and their configuration parameters.

For a variety of reasons, a system administrator may desire to generate and configure one or more data storage objects with the exact same, or similar, configuration parameters of an existing data storage object. For example, when configuring a back-up volume to store back-up data for an existing data volume, it may be necessary or desirable to have the back-up volume configured the same as the data volume to be backed up. Moreover, an enterprise may have business rules or best practices requiring, as a matter of policy, that similar data storage objects are configured with the same or similar configuration parameters.

Utilizing traditional management tools, generating and configuring a data storage object with configuration parameters to match those of an existing data storage object is a time consuming and error-prone process. Generally, the process involves two distinct steps. First, all of the configuration parameters for the existing data object must be identified and collected. Then, the data storage object must be manually generated and manually configured according to all of the configuration parameters of the existing data storage object.

To complete the first step of the process with traditional management applications, a system administrator must first find or identify the existing data storage object. For example, using a management application with a command line interface, this may be done by typing a command to list all data storage objects of a particular type (e.g., all volumes, or all RAID disk groups). After the existing data storage object has been identified, a second command may be entered to list one or more of the configuration parameters for the data storage object. In some cases, the configuration parameters must be written down so they are readily available for configuring the new data storage object. Finally, after all the configuration parameters have been identified for the existing data storage object, one or more commands, along with a long list of configuration parameters, may be entered to generate the new data storage object. Because the process involves several steps, and because many of the steps require manual input (e.g., typing a command with several parameters), the process is both time consuming and subject to human error.

To alleviate some of the problems, software developers have developed management applications with GUIs. However, even with a GUI-based management application, many of the problems remain. For example a system administrator is still generally required to first identify the configuration parameters for the existing data storage object, and then individually enter, or select, the proper configuration parameters when generating the new data storage object. Even with a GUI-based management application, this may require writing down the configuration parameters after they have been identified, or switching between two interfaces (e.g., windows)—one that displays the configuration parameters of the existing data storage object, and another where the configuration parameters are entered for the new data storage object. Consequently, even when using a management application with a GUI, configuring a data storage object based on the configuration of an existing data storage object may be time consuming and subject to human error.

SUMMARY OF THE DESCRIPTION

A method and system for configuring a new data storage object are provided. According to one aspect of the present invention, a user may utilize a management application's graphical user interface to identify an existing data storage object, such as a volume, on a storage system. Accordingly, the user may issue, or execute, a command via the graphical user interface to generate a new data storage object based on the existing data storage object identified by the user. Next, the management application may extract one or more configuration parameters and associated values for the existing data storage object identified by the user. Finally, the management application may automatically generate a new data storage object using each configuration parameter value extracted from the existing data storage object as the default value for the corresponding configuration parameter of the new data storage object.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for configuring a data storage object are described. In the following description, for purposes of explanation, numerous specific details are set forth in order to provide a thorough understanding of the present invention. It will be evident, however, to one skilled in the art that the present invention may be practiced without these specific details.

According to one aspect of the present invention, a graphical user interface (GUI) is provided to facilitate the generation of a new data storage object automatically configured according to the configuration parameter values of an existing data storage object. For example, in one embodiment of the invention, a system administrator may utilize a GUI to select (e.g., via a pointing device) an existing data storage object from a list of existing data storage objects of a particular type. Accordingly, a graphical representation of the existing data storage object selected by the administrator may be displayed, via the GUI, along with one or more configuration parameter values associated with the configuration parameters of the selected data storage object.

To generate a new data storage object with configuration parameter values that are the same as, or similar to, the selected existing data storage object, the administrator may communicate a request that identifies the existing data storage object (e.g., by selecting a link or button on the GUI). In response, one or more dialog boxes may be displayed, via the GUI, prompting the administrator to confirm the use of the configuration parameter values of the existing data storage object as the default configuration parameter values for the new data storage object. For example, the dialog boxes may be displayed in the form of a configuration wizard. In any case, after the administrator has confirmed or selected the configuration parameter values for the new data storage object, the data storage object is generated and configured in accordance with the configuration parameter values confirmed by the administrator.

Figure 1:
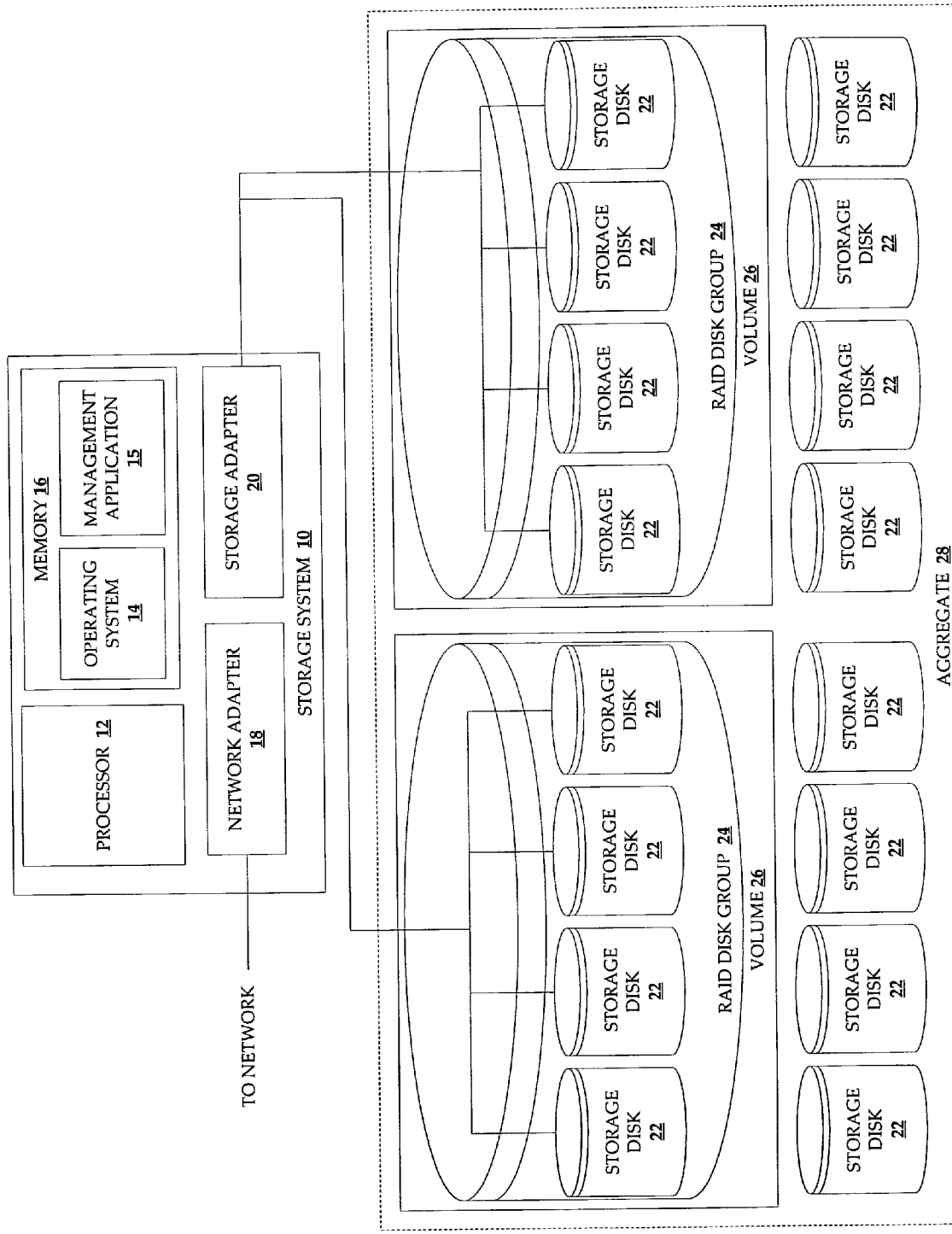
FIG. 1 illustrates an example of a storage system, consistent with one embodiment of the invention, including a variety of data storage objects.

FIG. 1 illustrates an example of a storage system 10, consistent with one embodiment of the invention, including a variety of data storage objects. In one embodiment of the invention, the storage system 10 may be a special purpose computer that provides file services for other applications connected to the storage system 10 via a network. Such special purpose computers are often referred to as network attached storage (NAS) servers.

In one embodiment of the invention, for example, the storage system 10 may be a Filer® available from Network Appliance® of Sunnyvale, Calif. Accordingly, the storage system 10 may be a file server, or a storage system that provides sub-file (e.g., block-level) access to stored data. Alternatively, the storage system 10 may be configurable to provide both file and block-level data storage services. The storage system 10 may have a processor 12 and a memory device 16 for executing a specialized operating system 14 and one or more administrative or management applications 15 for managing data storage objects. In addition, the storage system 10 may include a network adapter 18, which connects the storage system 10 to one or more computing devices (e.g., clients and/or servers) via a network. The storage system 10 may be connected via a storage adapter 20 to a group of physical storage disks 22, collectively referred to as an aggregate 28. In addition, it will be appreciated that in another embodiment, one or more storage systems may be implemented as a storage area network (SAN). For example, in one embodiment, one or more of the storage disks may be connected to a storage system via a data-switching device, such as a fibre channel data switch. Accordingly, each storage system may be a specialized device capable of providing client applications executing on a client device block-level access to data stored on the storage disks making up the SAN.

In the context of the present invention, a data storage object may include any type of physical or logical entity that is associated with a storage system 10 and configured to store data. For example, as illustrated in FIG. 1, a data storage object may include, but is not necessarily limited to: a storage disk 22, which may simply be referred to as a disk; a physical collection of disks, often referred to as an aggregate 28; a group of disks, such as a redundant array of independent disks (RAID), referred to as a RAID disk group 24; a SCSI LUN (i.e., a logical unit number for a small computer system interface); and/or, a volume 26. As illustrated in FIG. 1, a volume may be directly associated with a fixed group of physical disks representing a RAID group. However, it will be appreciated by those skilled in the art that a volume may also represent a virtual storage container with flexible characteristics that allow the volume to increase and decrease in size as necessary.

In one embodiment of the invention, each of the data storage objects may be generated and configured via an administrative or management application with a GUI. Moreover, consistent with one embodiment of the invention, in response to user-generated commands, new data storage objects may be automatically generated and configured using configuration parameter values extracted from existing data storage objects.

One type of data storage object to which the present invention is particularly applicable is a volume 26, or disk volume. A volume is a logical storage entity that may exist on a single storage disk 22, or may span several storage disks. A volume may have a fixed size that is determined at the time the volume is generated, or alternatively, a volume may be flexible in size such that it is capable of expanding as storage requirements increase. Furthermore, the disks on which a volume resides may be configured to operate as a group, such as a RAID disk group 24. Moreover, in at least one embodiment, a volume may represent a purely virtual storage container and may not have a direct association with a fixed group of disks. Although many of the following examples are presented in the context of generating and configuring new volumes based on the configuration parameters of existing volumes, one skilled in the art will appreciate the potential application of the invention to a wide variety of data storage objects in addition to volumes.

Furthermore, one skilled in the art will recognize that a management or administrative application consistent with the present invention may be implemented in a variety of ways. For example, the management application 15 may be implemented as a stand-alone application that resides, and executes, on a single storage system 10. As such, an administrator may interact with the management application 15 via a monitor, keyboard and pointing device (e.g., computer mouse) connected directly to the storage system. Alternatively, a management application may be implemented in a client-server paradigm. Accordingly, in one embodiment of the invention, the server component of the management application 15 may reside, and execute, on the storage system 10. An administrator may interact with the server component of the management application 15 via a client application executing on a client device connected to the storage system 10 via a network. Moreover, in one embodiment of the invention, the server application may be integrated with a web server component and accessed via a standard web browser client application. In yet another embodiment of the invention, the management application may be implemented on a management server. Accordingly, the management application on the management server may communicate over a network with a management application client component on one or more storage systems.

Figure 2:
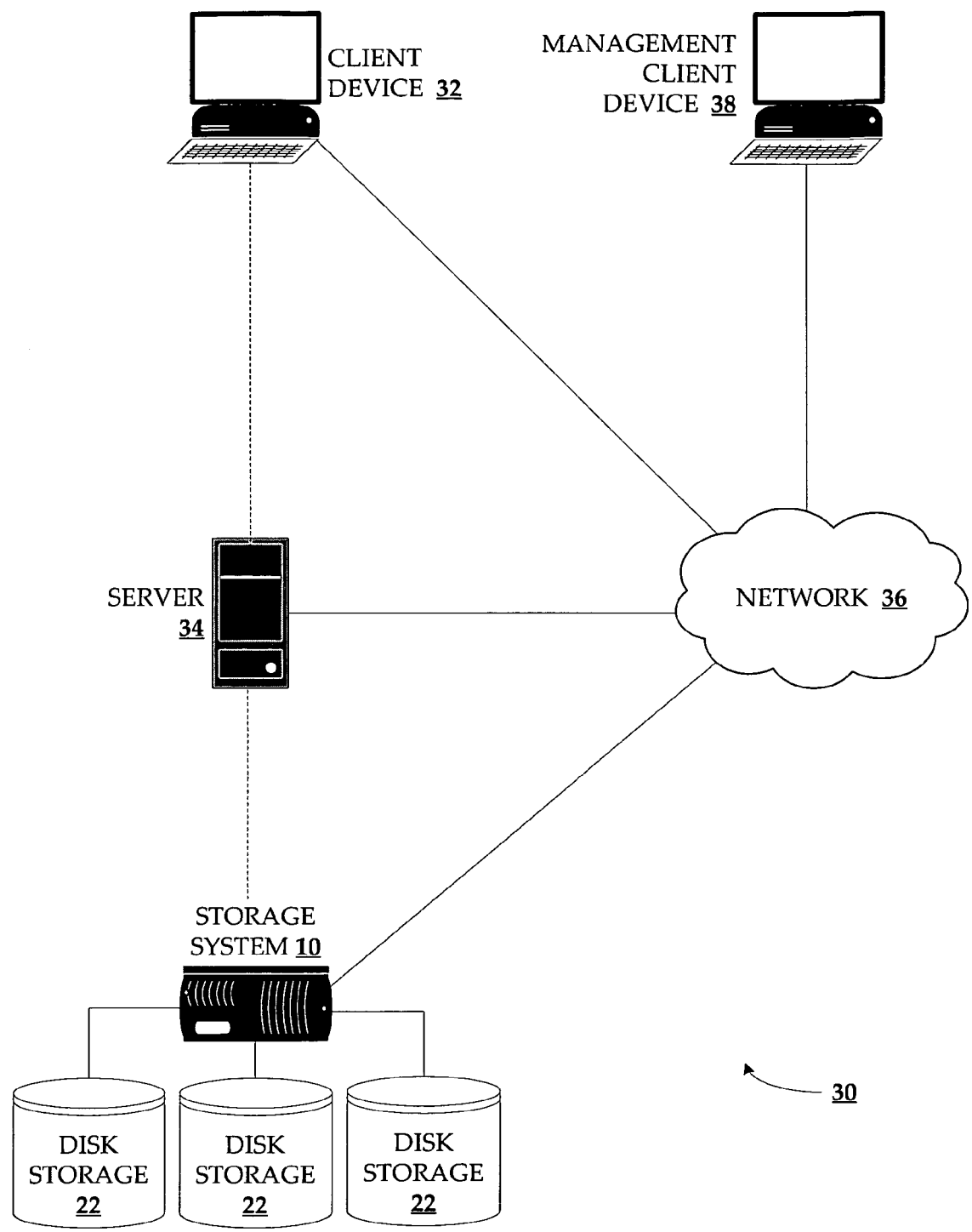
FIG. 2 illustrates a network environment including a data storage system based on a single storage system according to one embodiment of the invention.

FIG. 2 illustrates a network environment 30 including a data storage system 10 according to one embodiment of the invention. The network environment 30 includes a storage system 10, a client device 32, and a server 34 interconnected via a network 36. The storage system 10, which may have multiple storage disks 22 for storing data, may provide file services to a server application executing on the server 34. For example, the server 34 may be an application specific server, such as a database server, an email server, a web server, a file server, or any other type of application server. Accordingly, a client application executing on the client device 32 may interact with a server application executing on the server 34. For example, an email server application may, store email data as files on the storage disks 22 connected to the storage system 10. Alternatively, the server 34 may execute a database server application and the storage system 10 may store data for the database server application. Furthermore, the client application may read and write data directly over the network to the storage system 10.

According to one embodiment of the invention, the storage system 10 may execute an administrative or management application that allows a system administrator to generate, configure, browse and maintain data storage objects, such as volumes, on the storage system 10. The management application may be a stand-alone application that executes on the storage system 10. Alternatively, the management application may include a client application executing on a management client device 38. Accordingly, an administrator may interact with the client application, which may communicate with a server component on the storage system 10, to facilitate the generation and configuration of data storage objects, such as volumes, on the storage system 10.

Figure 3:
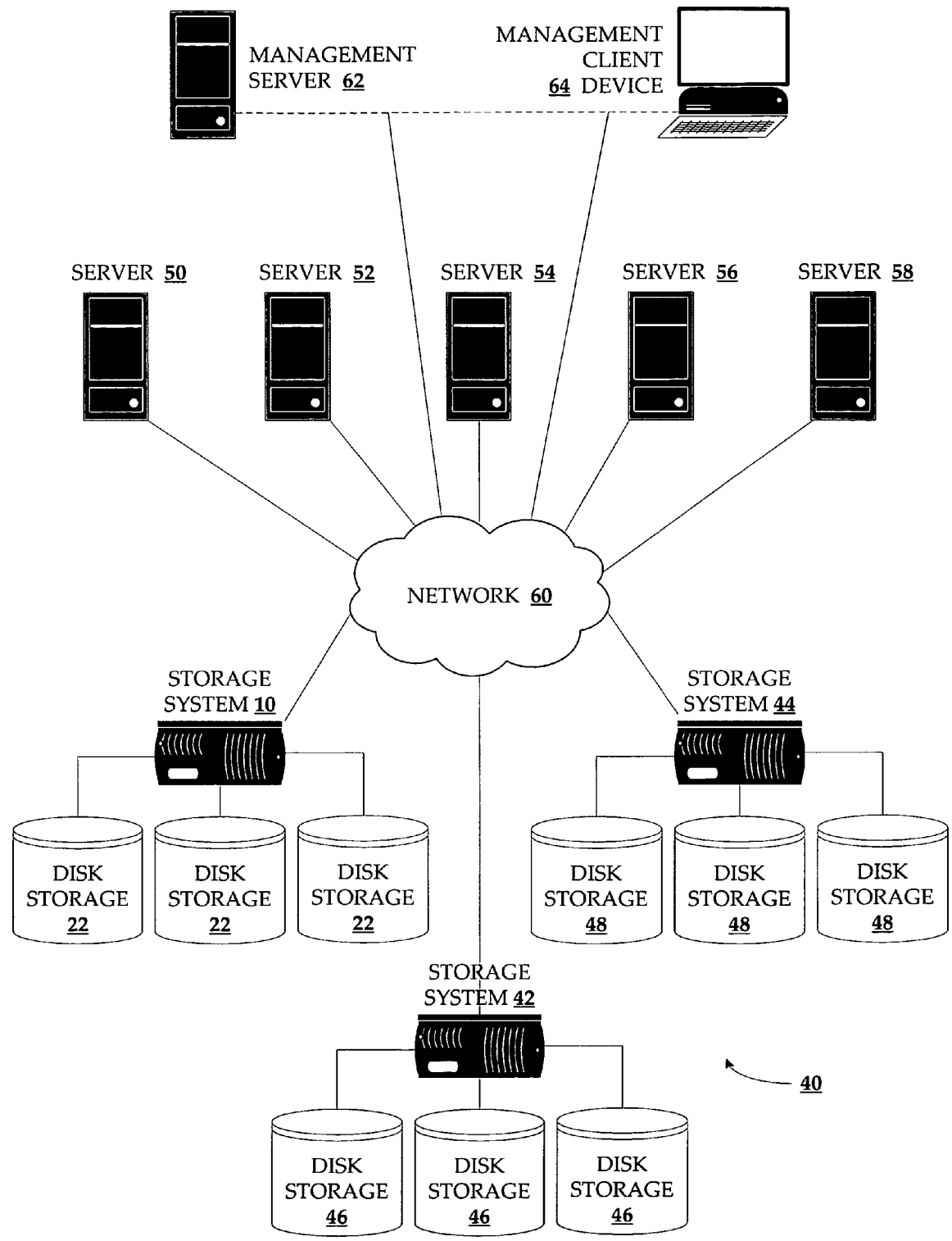
FIG. 3 illustrates an enterprise-wide network environment including a data storage system having multiple storage systems according to one embodiment of the invention.

FIG. 3 illustrates an enterprise-wide network environment 40 including multiple storage systems 10, 42 and 44, according to one embodiment of the invention. The network environment 40 of FIG. 3 is similar to that of FIG. 2, however, rather than having a single application server 34 connected to a single storage system 10 via a network 36, the enterprise-wide network 40 includes a pool of application servers 50, 52, 54, 56 and 58, connected via a network 60 to several data storage systems 10, 42 and 44. For example, the storage systems 10, 42, and 44 may each be configured with a variety of data storage objects (e.g., volumes) to store data for application servers executing on the pool of servers 50, 52, 54, 56 and 58.

In one embodiment of the invention, each of the storage systems 10, 42 and 44 may be located in different physical or geographical locations. Nonetheless, an administrator may desire to configure a backup volume on one storage system 44 to store backup data for a volume residing on another storage system 10. In one embodiment of the invention, to aid in the administration of such complex distributed data storage systems, a centralized administrative or management application may be used. For example, an enterprise-wide data storage management application may execute on an administrative or management server 62. The centralized administrative application may be a stand-alone application or may be implemented as a client-server system, in which the server component resides and executes on the management server 62 and is accessed via a client management application executing on a management client device 64.

Figure 4:
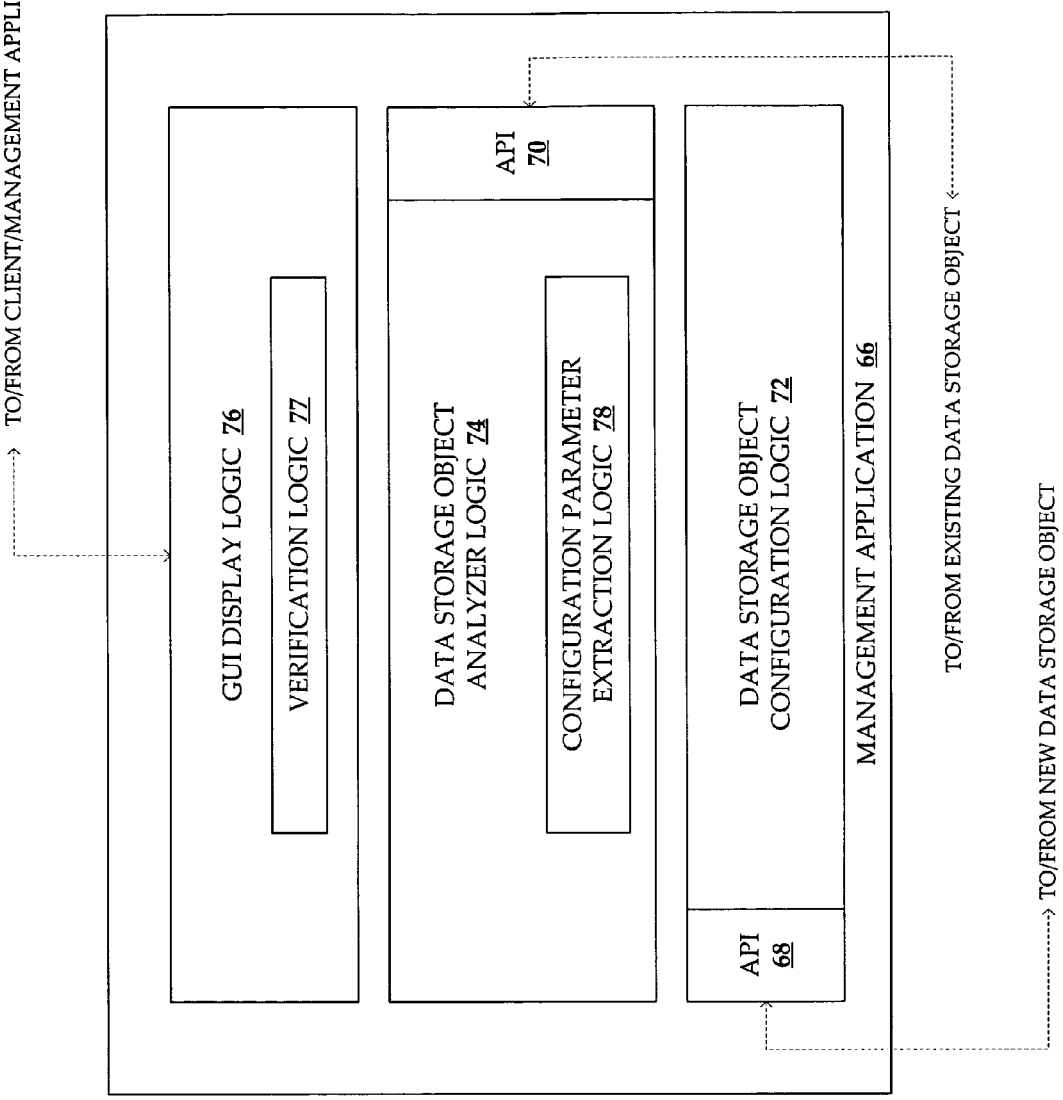
FIG. 4 illustrates a block diagram of the logical components of an administrative or management application, consistent with one embodiment of the invention, for generating and configuring data storage objects.

FIG. 4 illustrates a block diagram of the various logical components of a management application 66, consistent with one embodiment of the invention, for generating and configuring new data storage objects based on existing data storage objects. As described above in connection with FIG. 2 and FIG. 3, the management application may reside and execute on a storage system, or alternatively, it may reside and execute on a centralized management server. For example, in the example network environment illustrated in FIG. 2, the management application may be executing on the storage system 10. Similarly, in FIG. 3, the management application may reside and execute on the management server 62.

When implemented as part of an enterprise-wide management server 62, the management application 66 may send and receive messages over a network 68 to communicate with one or more storage systems 10, 42, 44. Furthermore, messages may be formatted and communicated in accordance with one or more application programming interfaces (APIs). In one embodiment, API commands are formatted as XML commands and communicated via the hypertext transfer protocol (HTTP), or secure hypertext transfer protocol (HTTPs). For example, by interacting with a management client device, an administrator may generate a request to view the configuration parameters of a data storage object on a storage system 10. Accordingly, the request may initially be communicated from the client portion of the management application (e.g., at the management client device) to the server component of the management application 66 executing on the management server 62. The management server 62 may process the request and generate a message that is forwarded to the storage system 10 on which the data storage object resides. The storage system 10 may receive the message, and respond accordingly with a response message providing the desired configuration parameters of the selected data storage object. In turn, the server component of the management application 66 may communicate a message to the client portion of the management application to manipulate the GUI to show the desired configuration parameters.

The following table (i.e., TABLE 1) provides an example of some of the API commands that may be implemented in one embodiment of the invention, for generating, configuring and browsing a volume:

TABLE 1

| API Command | Description |
| --- | --- |
| volume-create | Create a new flexible or traditional volume with the given name and characteristics. |
| volume-get-filer-info | Get information on what possibilities and parameters exist for volumes on a given filer. |
| volume-list-info | Get volume status. Note that all RAID-related status items (e.g., 'raid-size', 'raid-status', 'checksum-style') reported for a flexible volume may actually describe the state of its containing aggregate. |
| volume-options-list-info | Get the options that have been set for the specified volume. |

It will be appreciated by one skilled in the art that TABLE 1 is only a small subset of the potential API commands that may be implemented to create and generate data storage objects according to an embodiment of the present invention. Furthermore, an API command may have several arguments that may be required, or optional.

In one embodiment of the invention, the management application 66 may include configuration logic 72, analyzer logic 74, and GUI display logic 76. Accordingly, the GUI display logic 76 may facilitate an administrative interface by communicating with a GUI component of a client application (not shown) via a network. Moreover, in one embodiment, the GUI display logic 76 may be tightly integrated with a web server component (not shown). Accordingly, a standard web browser client may be used to access the management application for the purpose of administering the data storage system. Alternatively, the GUI display logic 76 may be implemented to work with a proprietary administrative client application. In either case, the GUI display logic 76 may send and receive messages to a GUI component to manipulate a visual display that is part of a client application.

The GUI display logic 76 may include verification logic 77 for verifying values input by a user or administrator. For example, in one embodiment of the invention, after an administrator has entered and submitted a variety of configuration parameter values via a client portion of a management application, the verification logic 77 may verify that each configuration parameter falls within one or more valid boundaries or is otherwise a valid value for the corresponding configuration parameter. For example, if an administrator issues a request to generate a new volume, the verification logic 77 may perform a validation routine to verify that the number and size of available spare disks is sufficient to fulfill the request.

In one embodiment of the invention, an administrator may interact with a GUI of a client application to browse a variety of existing data storage objects. To generate a new data storage object, the administrator may select a button or link on the GUI, which may cause a message to be communicated from the client portion of the administrative or management application to the GUI display logic 76 of the management application 66. Accordingly, the management application 66 may interpret the message and the GUI display logic 76 may communicate one or more response messages that may manipulate the visual display of the administrative client application's GUI.

In one embodiment of the invention, the analyzer logic 74 may analyze existing data storage objects. For example, if a request to browse the configuration parameters of a particular existing data storage object is received via the GUI display logic 76, the configuration parameter extraction logic 78 of the analyzer logic 74 may extract the configuration parameters and corresponding configuration parameter values from the existing data storage object. In one embodiment of the invention, the analyzer logic 78 may utilize an API 78 that defines a collection of command messages and protocols used by components of the management application 66 to facilitate communication between the server and client components. For example, in one embodiment of the invention, the management application 66 may reside and execute on a centralized management server 62. Accordingly, a client application may issue a request for configuration parameters on one of several data storage systems connected to the management server via a network. The analyzer logic 74 of the management application may communicate with each of the data storage systems by sending and receiving API messages over the network.

Similarly, the configuration logic 72 of the management application may utilize an API 68 to generate and configure new data storage objects on one or more storage systems. For example, in one embodiment of the invention, an administrator may request, via a GUI, to generate a new data storage object (e.g., a volume) on a storage system. Accordingly, the configuration logic may communicate a message to the storage system directing the storage system to generate a new data storage object. In one embodiment, the message will include the configuration parameter values to be used when generating the new data storage object.

Figure 5:
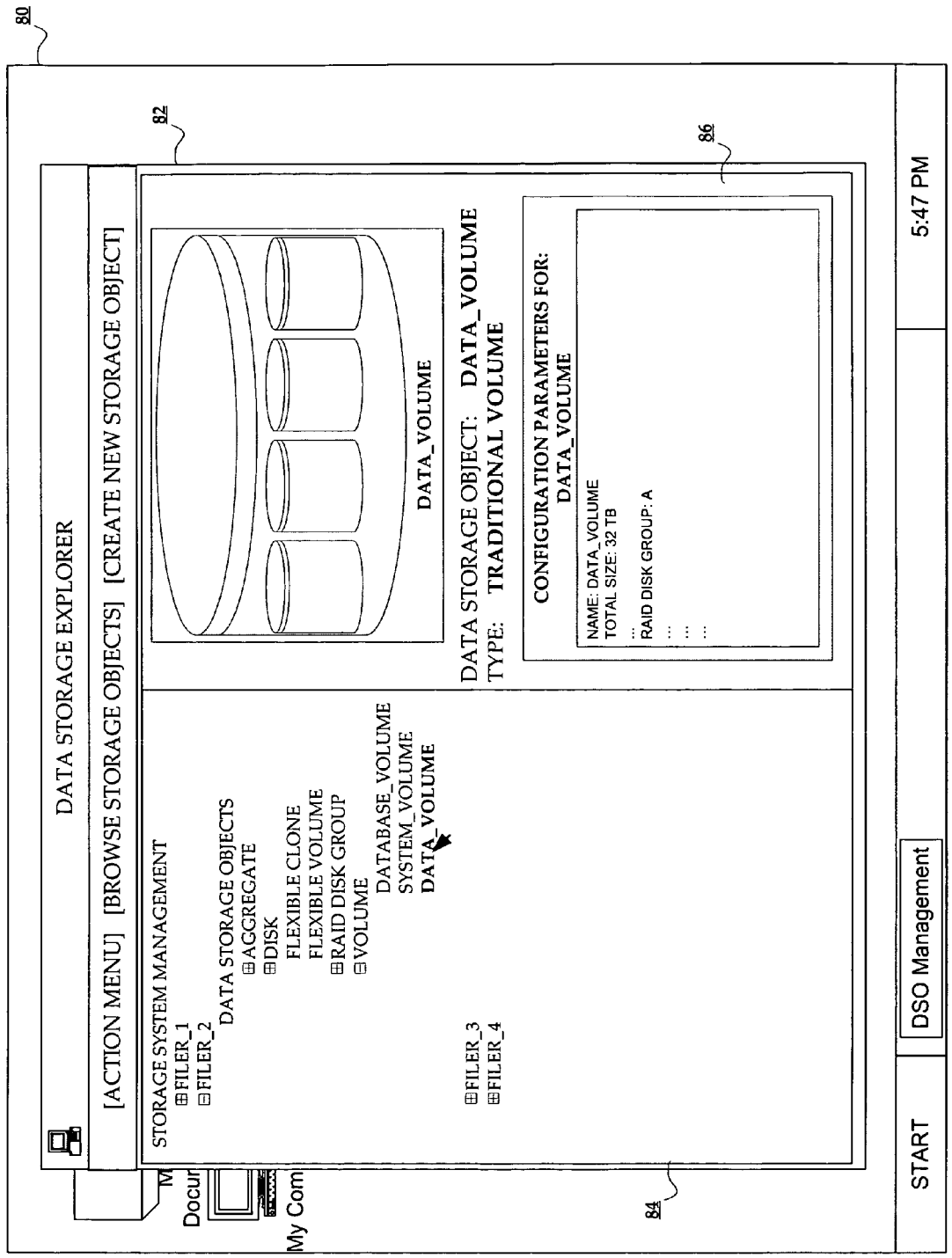
FIGS. 5, 6 and 7 illustrate examples of display screens with which an administrator may interact to generate and/or configure a new data storage object according to one embodiment of the invention.
Figure 6:
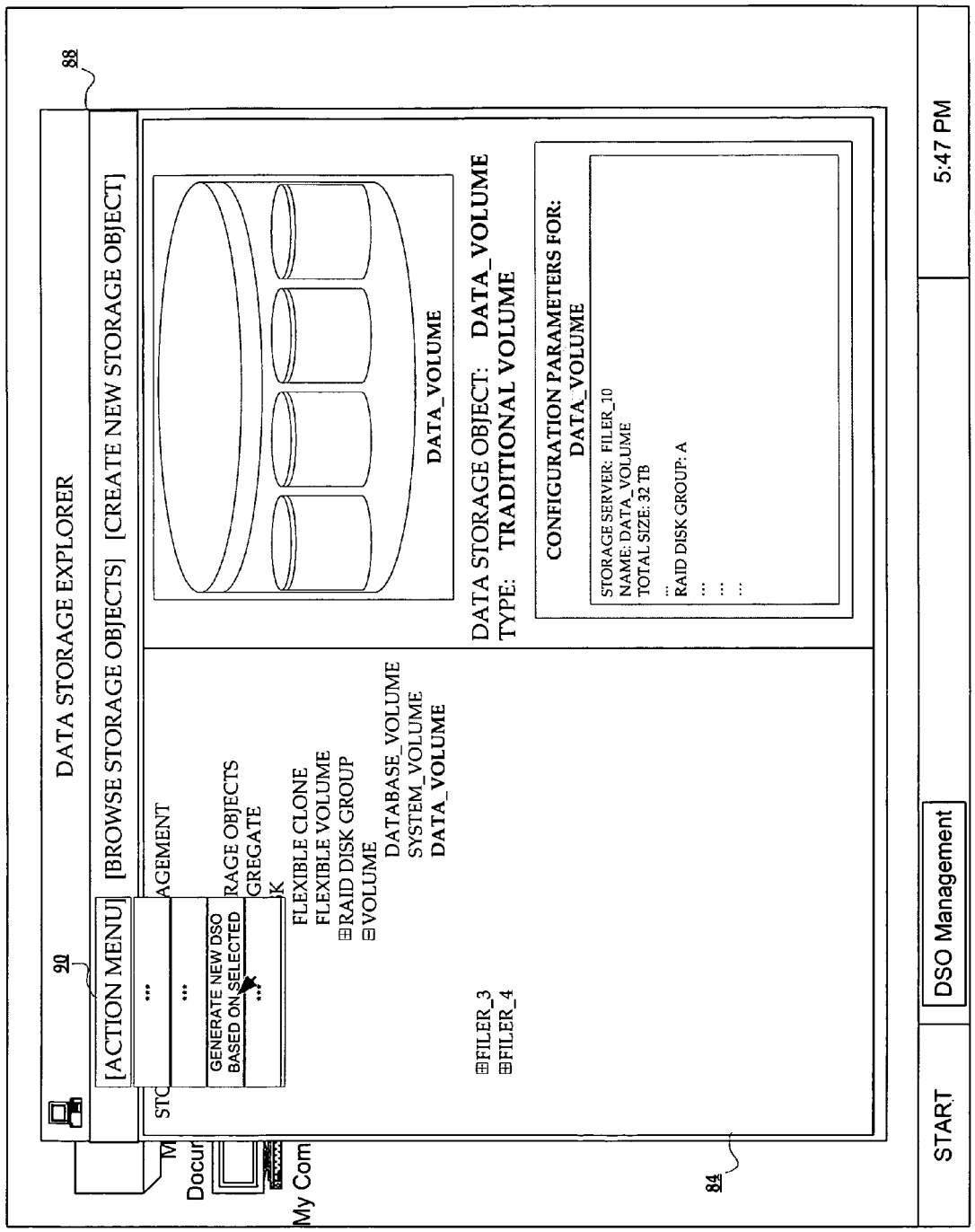
Figure 7:
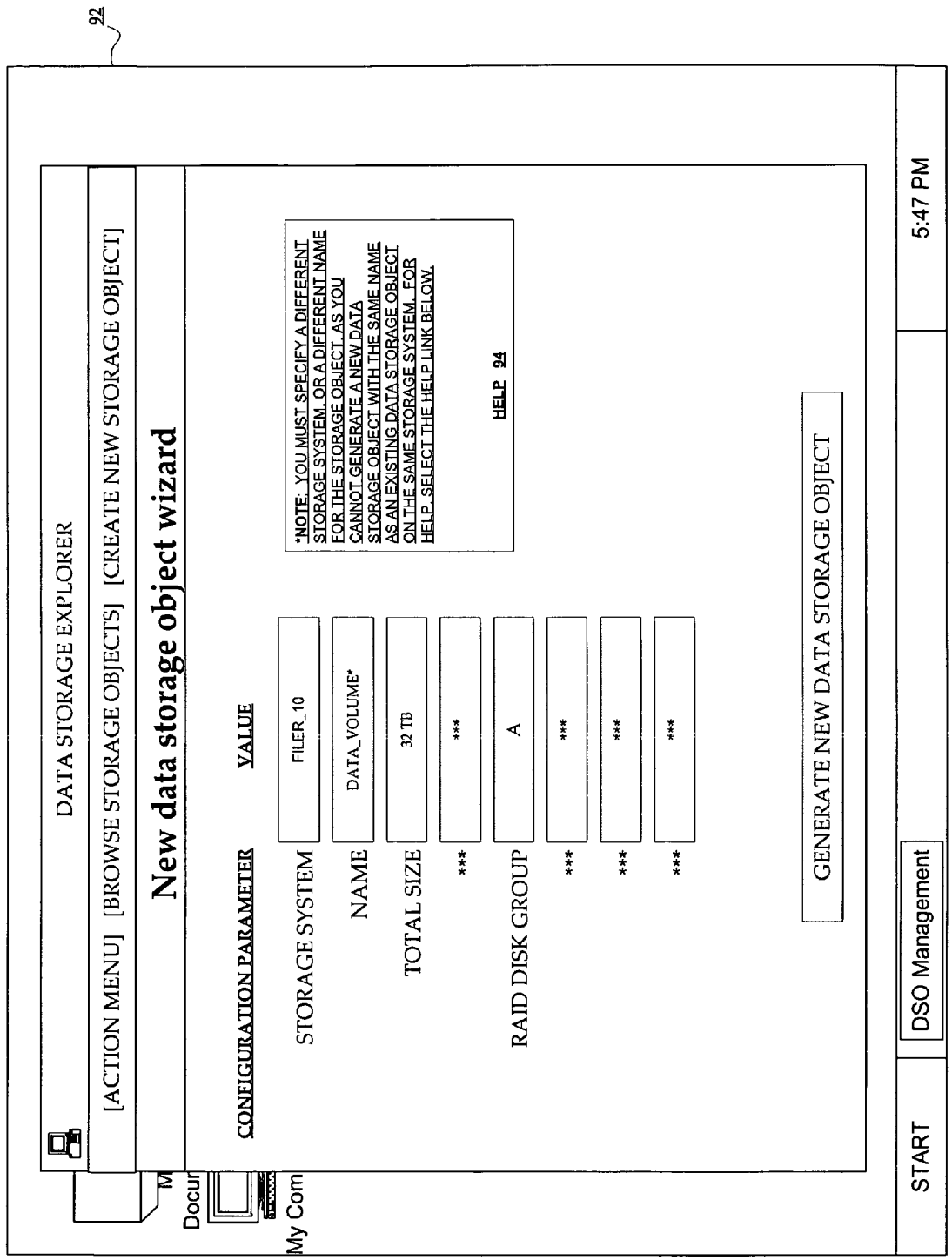

FIGS. 5, 6 and 7 illustrate examples of GUI display screens with which an administrator may interact to generate a new data storage object according to one embodiment of the invention. As illustrated in FIG. 5, one embodiment of the invention may provide a GUI display screen 80 including a window 82 for browsing one or more types of data storage objects that exist on one or more storage systems. For example, in the example display screen of FIG. 5, the left pane 84 of the window 82 shows a hierarchical view of data storage objects listed by type, for a particular storage system. In the particular example shown in FIG. 5, the left pane 82 of the window 80 shows that a volume with the name DATA_VOLUME residing on a storage system with the name FILER_2 has been selected. In one embodiment of the invention, for example, an administrator may expand or collapse the list of each type of data storage object, as well as the types of storage objects on the particular storage systems. To select a particular data storage object, an administrator may simply click (e.g., with a computer mouse or cursor control device) the name of the particular data storage object. Accordingly, in one embodiment of the invention, the right windowpane 86 may display information about the selected data storage object, such as a graphical representation of the data storage object and a listing of the configuration parameters and corresponding values. As illustrated in FIG. 5, the configuration parameters for the volume DATA_VOLUME are displayed.

In FIG. 6, the GUI display screen shows a window 88 with one of several potential mechanisms that may be used by an administrator to generate a new data storage object with configuration parameter values of an existing data storage object. For example, as illustrated in FIG. 6, an administrator may select a button or link in an ACTION MENU 90 to generate a new volume based on the configuration parameters of the previously selected volume with the name DATA_VOLUME. One skilled in the art will recognize that alternative embodiments of the invention may implement a wide variety of mechanisms for facilitating a selection to generate a new data storage object. For example, in one embodiment, an administrator may be presented with a menu, which includes the option to generate a new data storage object, when the administrator selects (e.g., by clicking a button on a computer mouse or cursor control device) a data storage object in the left windowpane 84.

FIG. 7 illustrates a GUI display screen 92 providing an administrator with an option to confirm or customize the configuration parameter values for the new data storage object before submitting a request to generate the data storage object. For example, the GUI display screen 92 shows all of the configuration parameters and associated configuration parameter values that have been extracted from the existing volume listed as default values for the new volume. Accordingly, the extracted configuration parameter values will be used as the default values if the administrator does not change or customize the displayed configuration parameter values. In one embodiment of the invention, the GUI display screen 92 may be implemented as a configuration wizard. For example, the configuration wizard may display a series of GUI display screens or dialog boxes, prompting the user to confirm, select, or customize a configuration parameter value for a corresponding configuration parameter on each dialog box.

In addition, one embodiment of the invention may include configuration parameter verification logic. For example, the GUI may include verification logic to verify that configuration parameter values, whether extracted from an existing data storage object or input or selected by the administrator, are acceptable for use with the new data storage object. For example the GUI may verify that the values fall within an acceptable range or limit. If for example, a selected volume size exceeds the maximum amount of storage on a disk or set of disks on which the volume is to reside, the verification logic of the GUI may indicate a warning to the administrator and prevent the new data storage object from being generated with the selected configuration parameters. In this particular example, the GUI display screen 92 includes a text box 94 warning the administrator that a volume cannot be generated with the same name as a volume that already exists on the storage system. Accordingly, the administrator may be required to either change the name of the volume, or to change the target storage system on which the volume is to be generated.

Figure 8:
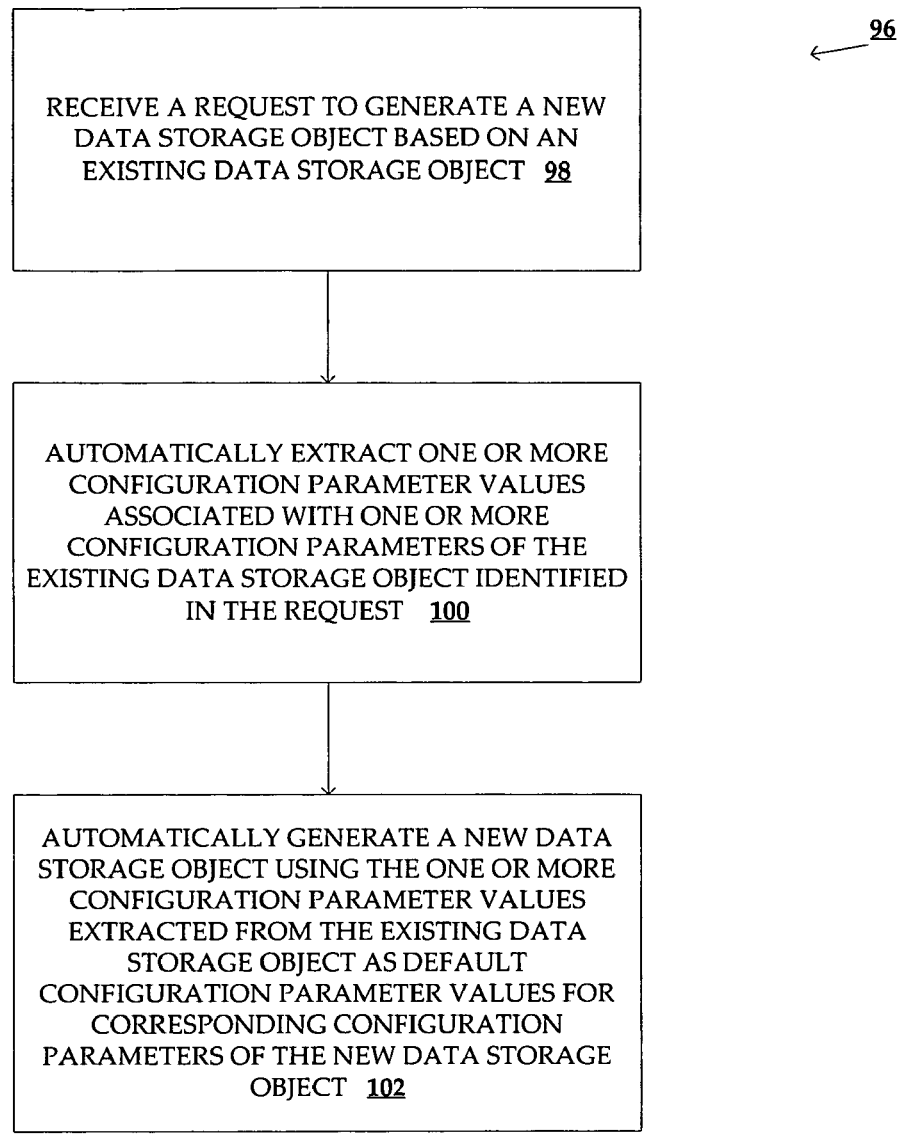
FIG. 8 illustrates a method, according to one embodiment of the invention, for generating and configuring a new data storage object.

FIG. 8 illustrates the operations involved in one method for generating a new data storage object based on the configuration parameter values of an existing data storage object. At operation 98, a request is received to generate a new data storage object (e.g., a volume). For example, in one embodiment, the request may be generated when a user interacts with a GUI and selects a button or link to generate the request. In addition, the request may identify an existing data storage object.

Next, at operation 100, one or more configuration parameter values are extracted from the existing data storage object. For example, in one embodiment, an extraction request message may be communicated over a network from a management application to a storage system containing the existing data storage object. Accordingly, the extraction request message may request that the data storage system respond with the configuration parameter values of the data storage object identified in the original request received from the user.

Finally, at operation 102, a new data storage object is generated with the configuration parameter values of the existing data storage object. For example, in one embodiment a management application may communicate an object generation request to a storage system, requesting the storage system to generate a new data storage object with the configuration parameter values included in the request. In response, the storage system may generate the data storage object. It will be appreciated by those skilled in the art that the operation 102 to generate a new data storage object may be performed via a series of API routines. For example, a first API routine may cause the generation of the data storage object, while successive API routines may set one or more configuration parameter values for the new data storage object.

Figure 9:
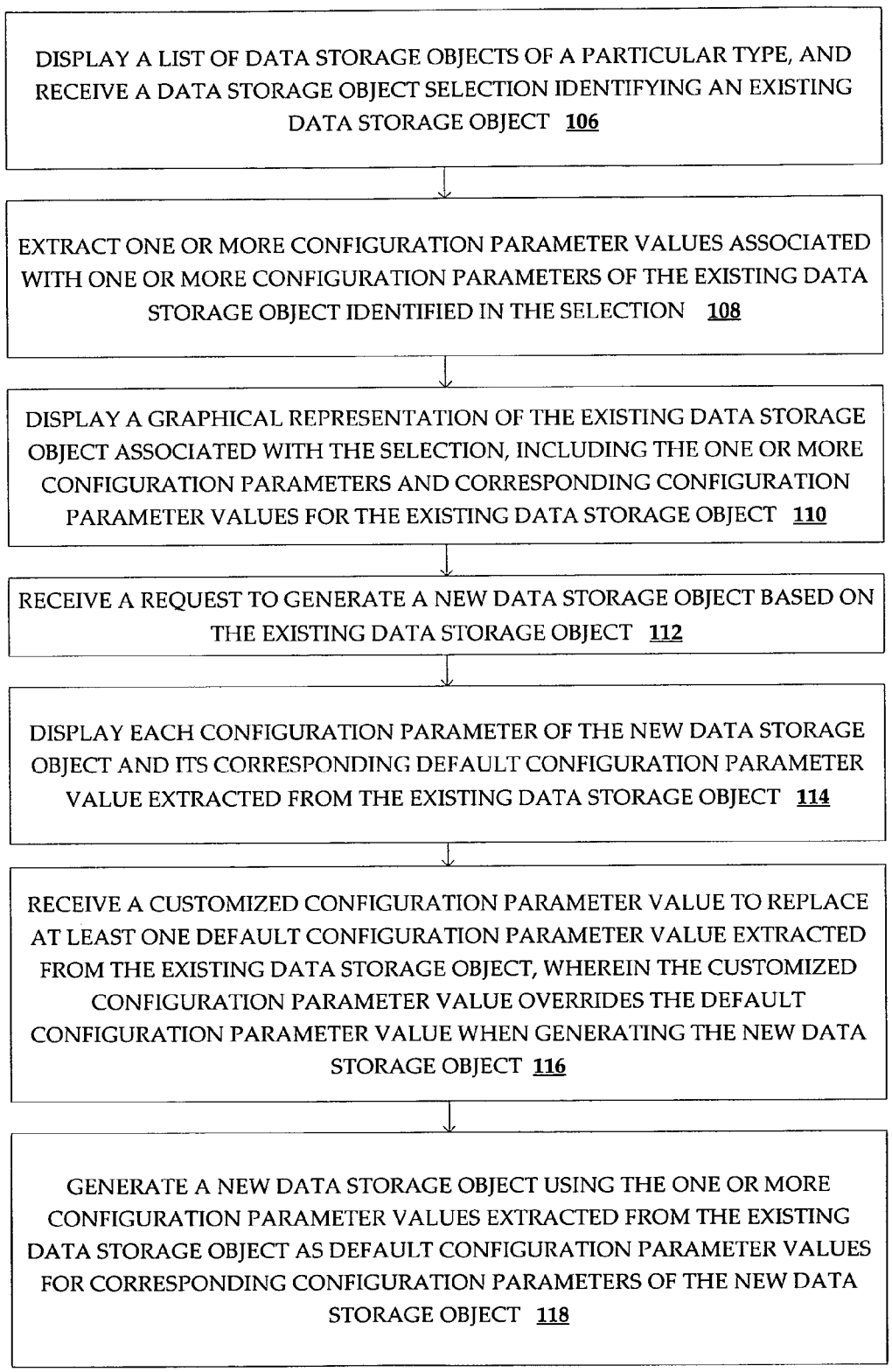
FIG. 9 illustrates a method, according to one embodiment of the invention, for generating and configuring a new data storage object.

FIG. 9 illustrates an alternative method for generating a data storage object, consistent with an embodiment of the invention. In one embodiment of the invention, an administrator may desire to browse existing data storage objects. Accordingly, at operation 106, a list of data storage objects of a particular type is displayed. In addition, a data storage object selection may be received. For example, an administrator may select (e.g., with a pointing device) a data storage object, which is identified in a request communicated from the GUI to the administrative application.

At operation 108, one or more configuration parameter values are extracted from the data storage object. For example, in one embodiment, an extraction request message may be communicated over a network from a management application to a storage system containing the existing data storage object. Accordingly, the extraction request message may request that the data storage system respond with the configuration parameter values of the data storage object identified in the original request received from the user. Next, at operation 110, a graphical representation of the existing data storage object and all of its configuration parameters and corresponding configuration parameter values are displayed to the administrator.

Next, at operation 112, in response to an administrator selecting a particular link or button, a request to generate a new data storage object based on the selected existing data storage object may be received. Accordingly, at operation 114, a dialog box may be displayed showing the configuration parameters extracted from the existing data storage object as the default configuration parameter values for the new data storage object. At operation 116, a customized configuration parameter value may be received. For example, if an administrator chooses to use a configuration parameter value for a configuration parameter other than the value extracted from the existing data storage object, the administrator may select a custom value from a list, or input a custom value. Finally, at operation 118, a new data storage object is generated according to the configuration parameters of the existing data storage object, and any custom configuration parameter values selected or input at operation 116.

Thus, a method and system for configuring a data storage object have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method for generating a new non-physical data storage object, the method comprising:
transmitting a message from a management server to a storage server, the message including a request to identify one or more existing non-physical data storage objects, the one or more non-physical data storage objects for display to a user via a graphical user interface;
receiving, at the management server, a response from the storage server identifying the one or more existing non-physical data storage objects at the storage server;

displaying, at the management server, via a graphical user interface, information identifying the one or more existing non-physical data storage objects;

receiving, at the management server, a user-generated command representing a selection of an existing non-physical data storage object displayed among the one or more existing non-physical data storage objects, said command identifying a particular existing non-physical data storage object;

responsive to receiving the user-generated command via the graphical user interface, initiating, at the management server, analyzer logic to extract one or more values associated with one or more configuration parameters of said particular existing non-physical data storage object identified in the user-generated command;

responsive to receiving the user-generated command via the graphical user interface, initiating, at the management server, configuration logic to transmit an instruction to the storage server to cause the storage server to generate the new non-physical data storage object; and responsive to receiving the instruction, automatically generating, at the storage server, the new non-physical data storage object as a virtual storage container using each value extracted from said particular existing non-physical data storage object as the default value for the corresponding configuration parameter of the new non-physical data storage object; wherein the virtual storage container is created as a portion of an aggregate of multiple RAID (redundant array of independent disks) groups, the virtual storage container including storage from more than one of the multiple RAID groups, the virtual storage container having flexible characteristics allowing for changes to a total data storage size of the virtual storage container.

2. The computer-implemented method of claim 1, further comprising:

prior to generating the new non-physical data storage object, displaying each value extracted from the existing data storage object and its corresponding configuration parameter to the user; and receiving from the user one or more selections, each selection indicating (i) a value extracted from the existing non-physical data storage object is to be used as the value for the corresponding configuration parameter of the new non-physical data storage object, or (ii) a customized value to be used in place of the default value for the corresponding configuration parameter of the new non-physical data storage object.

3. The method of claim 2, wherein the selection indicating a customized value to be used for the corresponding configuration parameter of the new non-physical data storage object is received as a result of the user selecting the customized value from a list of values presented to the user.

4. The method of claim 2, wherein the selection indicating a customized value to be used for the corresponding configuration parameter of the new non-physical data storage object is received as a result of the user inputting the customized value.

5. A computer-implemented method for generating a new non-physical data storage object, the method comprising:

transmitting a message, the message including a request to identify one or more existing non-physical data storage objects, the one or more non-physical data storage objects for display to a user via a graphical user interface;

receiving a response identifying the one or more existing non-physical data storage objects;

displaying information identifying the one or more existing non-physical data storage objects;

receiving a user-generated command including a request to generate the new non-physical data storage object, the request identifying a particular existing non-physical data storage object;

initiating analyzer logic to extract one or more configuration parameter values associated with one or more configuration parameters of said particular existing non-physical data storage object identified in the request; and initiating configuration logic to transmit an instruction to generate the new non-physical data storage object as a virtual storage container using the one or more configuration parameter values extracted from said particular existing non-physical data storage object identified in the request as default configuration parameter values for corresponding configuration parameters of the new non-physical data storage object; wherein the virtual storage container is created as a portion of an aggregate of multiple RAID (redundant array of independent disks) groups, the virtual storage container including storage from more than one of the multiple RAID groups, the virtual storage container having flexible characteristics allowing for changes to a total data storage size of the virtual storage container.

6. The computer-implemented method of claim 5, further comprising:

prior to generating the non-physical new data storage object, displaying each configuration parameter of the new non-physical data storage object and its corresponding default configuration parameter value extracted from the existing non-physical data storage object; and receiving a customized configuration parameter value to replace at least one default configuration parameter value extracted from the existing non-physical data storage object, wherein the customized configuration parameter value overrides the default configuration parameter value when generating the new non-physical data storage object.

7. The method of claim 5, wherein said extracting one or more configuration parameter values associated with one or more configuration parameters of the existing non-physical data storage object identified in the request includes communicating a first message to a storage server containing the existing non-physical data storage object, the first message including a request for one or more configuration parameter values associated with the existing non-physical data storage object.

8. The method of claim 7, further comprising:

receiving, from the storage server containing the existing non-physical data storage object, a second message including one or more configuration parameter values of the existing non-physical data storage object.

9. The method of claim 8, wherein the first message and the second message are part of an application-programming interface.

10. The method of claim 5, further comprising:

prior to receiving a request to generate a new non-physical data storage object, displaying a list of non-physical data storage objects of a particular type and receiving a non-physical data storage object selection, the non-physical data storage object selection identifying the existing non-physical data storage object; and responsive to receiving the data storage object selection, displaying a graphical representation of the existing data storage object associated with the selection, including the one or more configuration parameters and associated one or more configuration parameter values of the existing data storage object.

11. The method of claim 5, wherein the request is received as a result of a user's interaction with a graphical user interface.

12. The method of claim 5, further comprising:
displaying the one or more configuration parameter values of the existing non-physical data storage object via a graphical user interface.

13. The method of claim 5 wherein the existing non-physical data storage object exists on a first data storage system and said generating the new non-physical data storage object includes generating the new non-physical data storage object on a second storage system.

14. The method of claim 5, wherein the one or more configuration parameter values are associated with configuration parameters including any one of the following: number of disks; arrangement of disks in a RAID group; size of disks; pooling characteristics for a disk; local synchronous mirroring settings; volume language; volume name; RAID level; root volume.

15. A computer-implemented method for generating a new volume, the method comprising:
transmitting a message from a management server to a storage server, the message including a request to identify one or more existing volumes, the one or more volumes for display to a user via a graphical user interface;
receiving at the management server, a response from the storage server identifying the one or more existing volumes at the storage server;
displaying, at the management server, a graphical representation of the one or more existing volumes;
receiving, at the management server, a volume selection identifying an existing volume, of the volumes displayed via the graphical user interface;
receiving, at the management server, a request to generate a new volume configured according to configuration parameters and associated configuration parameter values of the existing volume identified in the volume selection;
initiating, at the management server, analyzer logic to extract the configuration parameter values from the existing volume identified in the volume selection; and
initiating, at the management server, configuration logic to transmit an instruction to the storage server to cause the storage server to generate the new volume as a virtual storage container configured according to the configuration parameter values of the existing volume identified in the volume selection; wherein the virtual storage container is created as a portion of an aggregate of multiple RAID (redundant array of independent disks) groups, the virtual storage container including storage from more than one of the multiple RAID groups, the virtual storage container having flexible characteristics allowing for changes to a total data storage size of the virtual storage container.

16. The method of claim 15, wherein said displaying a graphical representation of one or more existing volumes includes displaying a graphical representation of the configuration parameters and associated configuration parameter values of the existing volume.

17. The method of claim 15, further comprising:
after receiving a request to generate a new volume configured according to configuration parameters and associated configuration parameter values of the existing volume identified in the volume selection, displaying a graphical representation of the new volume including configuration parameters and associated configuration parameter values of the new volume.

18. The method of claim 15, further comprising:
receiving a configuration parameter value selection for a configuration parameter of the new data storage object, wherein the configuration parameter value selection overrides the configuration parameter value associated with the configuration parameter of the existing volume.

19. The method of claim 18, wherein said configuration parameter value selection is received from a user as a result of the user's interaction with a graphical user interface.

20. A system for generating a new non-physical data storage object, the system comprising:
a processor; and
a memory storing instructions for execution by the processor including:
graphical user interface logic to display a graphical representation of one or more existing non-physical data storage objects to a user and to receive a non-physical data storage object selection from the user, said selection identifying a particular existing non-physical data storage object, the non-physical data storage object selection identifying an existing non-physical data storage object on a first data storage server;
extraction logic to extract one or more configuration parameter values from said particular existing non-physical data storage object on the first data storage server; and
configuration logic to prepare an instruction for transmission to the first storage server to cause the first storage server to generate the new non-physical data storage object as a virtual storage container configured according to the configuration parameter values of said particular existing non-physical data storage object identified in the selection;
wherein the virtual storage container is created as a portion of an aggregate of multiple RAID (redundant array of independent disks) groups, the virtual storage container including storage from more than one of the multiple RAID groups, the virtual storage container having flexible characteristics allowing for changes to a total data storage size of the virtual storage container;
wherein, a message is transmitted in accordance with the preparation by the configuration logic, the message including a request to identify one or more existing non-physical data storage objects, the one or more existing non-physical data storage objects for display to a user via a graphical user interface;
wherein, a response is received identifying the one or more existing non-physical data storage objects at the first storage server;
wherein the graphical user interface logic displays information identifying the existing non-physical data storage object to a user along with zero or more other existing non-physical data storage objects;
wherein, the graphical user interface logic receives a user-generated command representing a selection of the existing non-physical data storage object displayed among the one or more existing non-physical data storage objects;
wherein, responsive to the user-generated command, the analyzer logic is initiated to extract one or more values associated with one or more configuration parameters of said particular existing non-physical data storage object; and wherein, responsive to receiving the user-generated command via the graphical user interface, the configuration logic is initiated to transmit an instruction to the first storage server to cause the first storage server to generate the new non-physical data storage object.

21. The system of claim 20, wherein the configuration logic is to generate the new non-physical data storage object on the first data storage server.

22. The system of claim 20, wherein the configuration logic is to generate the new non-physical data storage object on a second data storage server.

23. The system of claim 20, wherein the configuration logic is to generate the new non-physical data storage object configured according to the configuration parameter values of the existing non-physical data storage object in response to the graphical user interface logic receiving a request to generate the new non-physical data storage object, the request generated as a result of the user's interaction with a graphical user interface associated with the graphical user interface logic.

24. The system of claim 20, wherein said extraction logic is to communicate a message to the first data storage server, the message identifying the existing non-physical data storage object from which the configuration parameters are to be extracted.

25. The system of claim 24, wherein the extraction logic is to receive a second message from the first data storage server, the second message including configuration parameter values for the existing non-physical data storage object.

26. The system of claim 25, wherein the configuration logic is to communicate a message to the first storage server, the message directing the first storage server to generate the new non-physical data storage object configured according to the configuration parameters of the existing non-physical data storage object.

27. The system of claim 26, wherein the first storage server includes an application-programming interface, and messages communicated between the extraction logic and the first data storage system are formatted and communicated according to the application-programming interface.

28. The system of claim 26, wherein the second storage server a includes an application-programming interface, and messages communicated between the configuration logic and the first data storage system are formatted and communicated according to the application-programming interface.

29. A system for generating a new volume, the system comprising:
   a processor; and
   a machine readable medium storing instructions for execution by the processor including:
      graphical user interface display logic to receive a volume selection from a user, the volume selection identifying a particular existing volume and requesting the creation of a new volume configured according to one or more configuration parameter values of the existing volume;
      extraction logic to extract the one or more configuration parameter values from the existing volume;
      verification logic to verify that the system has sufficient resources to accommodate the new volume configured according to the one or more configuration parameter values of the existing volume; and
      configuration logic to generate the new volume as a virtual storage container configured according to the one or more configuration parameter values of the existing volume;
   wherein the virtual storage container is created as a portion of an aggregate of multiple RAID (redundant array of independent disks) groups, the virtual storage container including storage from more than one of the multiple RAID groups, the virtual storage container having flexible characteristics allowing for changes to a total data storage size of the virtual storage container;
   wherein, a message is transmitted, the message including a request to identify one or more existing volumes, the one or more volumes for display to a user via a graphical user interface;
   wherein the graphical user interface logic displays the one or more existing volumes to a user;
   wherein, the graphical user interface logic receives a user-generated command representing a selection of the volume;
   wherein responsive to receiving the selection, the graphical user interface logic generates a command to extract configuration parameters associated with the existing volume, said command identifying the particular existing volume;
   wherein the analyzer logic is initiated to extract one or more values associated with one or more configuration parameters of said particular existing volume identified in the command; and
   wherein, responsive to receiving the command, the configuration logic is initiated to transmit an instruction to a storage system to cause the storage system to generate the new volume.

30. The system of claim 29, wherein the verification logic to verify that the one or more configuration parameter values fall within one or more valid boundaries.

31. The system of claim 30, wherein the verification logic directs the graphical user interface display logic to display a warning if the one or more configuration parameter values fall outside the one or more valid boundaries.

\* \* \* \* \*